(12) United States Patent
Hallinan et al.

(10) Patent No.: US 7,877,971 B1
(45) Date of Patent: Feb. 1, 2011

(54) MOWER TRIMMER COMBINATION FOR FACILITATING SIMULTANEOUS MOWING AND EDGE TRIMMING IN A SINGLE PASS

(75) Inventors: Patrick Hallinan, Bristow, VA (US); Karl W. MacDonald, Center Moriches, NY (US); Carl Novak, Moriches, NY (US); Joseph Cassella, Middleburgh, NY (US); Joseph Basile, Manorville, NY (US); James Schreck, Centereach, NY (US); Stanley Lewandowski, Manorville, NY (US)

(73) Assignee: Department of Veterans Affairs, Washington, DC (US)

( * ) Notice: Subject to any disclaimer, the term of this patent is extended or adjusted under 35 U.S.C. 154(b) by 0 days.

(21) Appl. No.: 10/813,078

(22) Filed: Mar. 31, 2004

Related U.S. Application Data

(60) Provisional application No. 60/458,966, filed on Apr. 1, 2003.

(51) Int. Cl.
*A01D 75/18* (2006.01)
(52) U.S. Cl. .......................... 56/10.4; 56/17.4
(58) Field of Classification Search .............. 56/12.7, 56/17.3, 295, 255, 10.4, 17.4, 314, 320, 320.1, 56/DIG. 20, DIG. 22; 30/276
See application file for complete search history.

(56) References Cited

U.S. PATENT DOCUMENTS

| | | | | |
|---|---|---|---|---|
| 2,263,431 A | * | 11/1941 | White | 56/13.4 |
| 3,526,083 A | * | 9/1970 | Watson et al. | 56/10.7 |
| 3,721,074 A | * | 3/1973 | Heth | 56/10.4 |
| 3,923,316 A | * | 12/1975 | Birnbaum et al. | 280/11.227 |
| 4,326,570 A | * | 4/1982 | Fridley et al. | 144/336 |
| 4,894,916 A | * | 1/1990 | Nimz et al. | 30/298.4 |
| 4,949,534 A | | 8/1990 | Evans | |
| 5,065,566 A | * | 11/1991 | Gates | 56/12.7 |
| 5,107,665 A | * | 4/1992 | Wright | 56/12.7 |
| 5,159,803 A | | 11/1992 | Earley, Jr. | |
| 5,167,108 A | | 12/1992 | Bird | |
| D339,145 S | | 9/1993 | Earley, Jr. | |
| 5,303,532 A | | 4/1994 | Phillips | |
| 5,425,224 A | * | 6/1995 | Downey et al. | 56/15.8 |
| 5,561,969 A | | 10/1996 | Sandy | |
| 5,570,814 A | | 11/1996 | Havlovitz | |
| 5,577,374 A | | 11/1996 | Huston | |
| 5,694,752 A | | 12/1997 | Warfield, III | |

(Continued)

FOREIGN PATENT DOCUMENTS

WO    WO02/13617    2/2002

*Primary Examiner*—Alicia M Torres
(74) *Attorney, Agent, or Firm*—Dykema Gossett PLLC

(57) ABSTRACT

A trimming system for a user-operated ground vehicle capable of performing mowing and trimming operations. The system includes a drive operatively coupled to a drive system of the vehicle having the trimming system mounted thereon, and a trimming unit operatively coupled to the drive for performing edge trimming operations. The drive may include at least one driven pulley operatively coupled to a drive pulley of the vehicle for driving the trimming unit. The drive pulley may be coupled to a mowing unit and the trimming unit to either selectively or simultaneously drive the mowing and trimming units. A guide wheel may be mounted on the vehicle adjacent the trimming unit for maintaining the trimming wires of the trimming unit at a predetermined distance from a stationary object during performance of edge trimming operations.

19 Claims, 3 Drawing Sheets

U.S. PATENT DOCUMENTS

| | | | |
|---|---|---|---|
| 5,704,201 A | 1/1998 | Van Vleet | |
| 5,802,824 A | 9/1998 | Aldrich | |
| 5,937,625 A | 8/1999 | Seegert | |
| 5,950,317 A | 9/1999 | Yates et al. | |
| 5,960,617 A * | 10/1999 | Sheldon | 56/17.5 |
| 5,966,914 A * | 10/1999 | Reents | 56/16.7 |
| 5,970,693 A | 10/1999 | Ciaglo | |
| 6,014,835 A | 1/2000 | Pivonka | |
| 6,032,441 A | 3/2000 | Gust et al. | |
| 6,032,443 A * | 3/2000 | Aldrich | 56/13.7 |
| 6,056,067 A | 5/2000 | Brown | |
| 6,094,896 A | 8/2000 | Lane | |
| 6,182,428 B1 | 2/2001 | Hatfield | |
| 6,343,461 B1 * | 2/2002 | Knott | 56/16.9 |
| 6,345,489 B1 | 2/2002 | Everts et al. | |
| 6,351,929 B1 | 3/2002 | Gust et al. | |
| 6,363,699 B1 | 4/2002 | Wang | |
| 6,381,854 B1 * | 5/2002 | Pagliero | 30/276 |
| 6,389,786 B1 | 5/2002 | Bergsten et al. | |
| 6,427,429 B1 | 8/2002 | Brabenec | |
| 6,474,053 B1 | 11/2002 | Lund | |
| 6,546,706 B1 | 4/2003 | Nafziger | |
| 6,591,592 B1 * | 7/2003 | Krimminger | 56/10.4 |
| 6,722,284 B2 * | 4/2004 | Gustafson et al. | 105/30 |
| 6,786,030 B2 * | 9/2004 | Nafziger | 56/12.7 |
| 2002/0129588 A1 | 9/2002 | Handlin | |

* cited by examiner

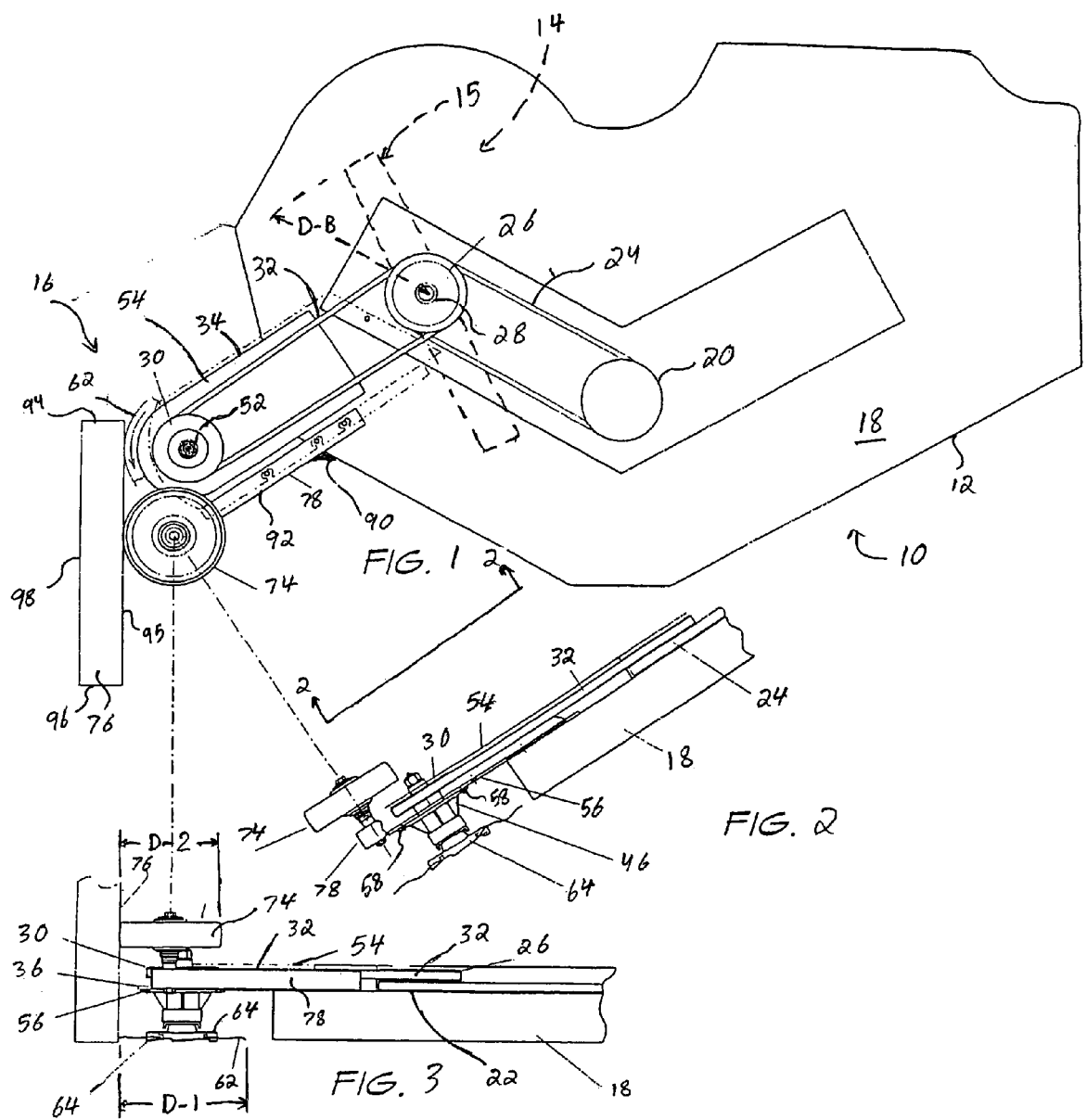

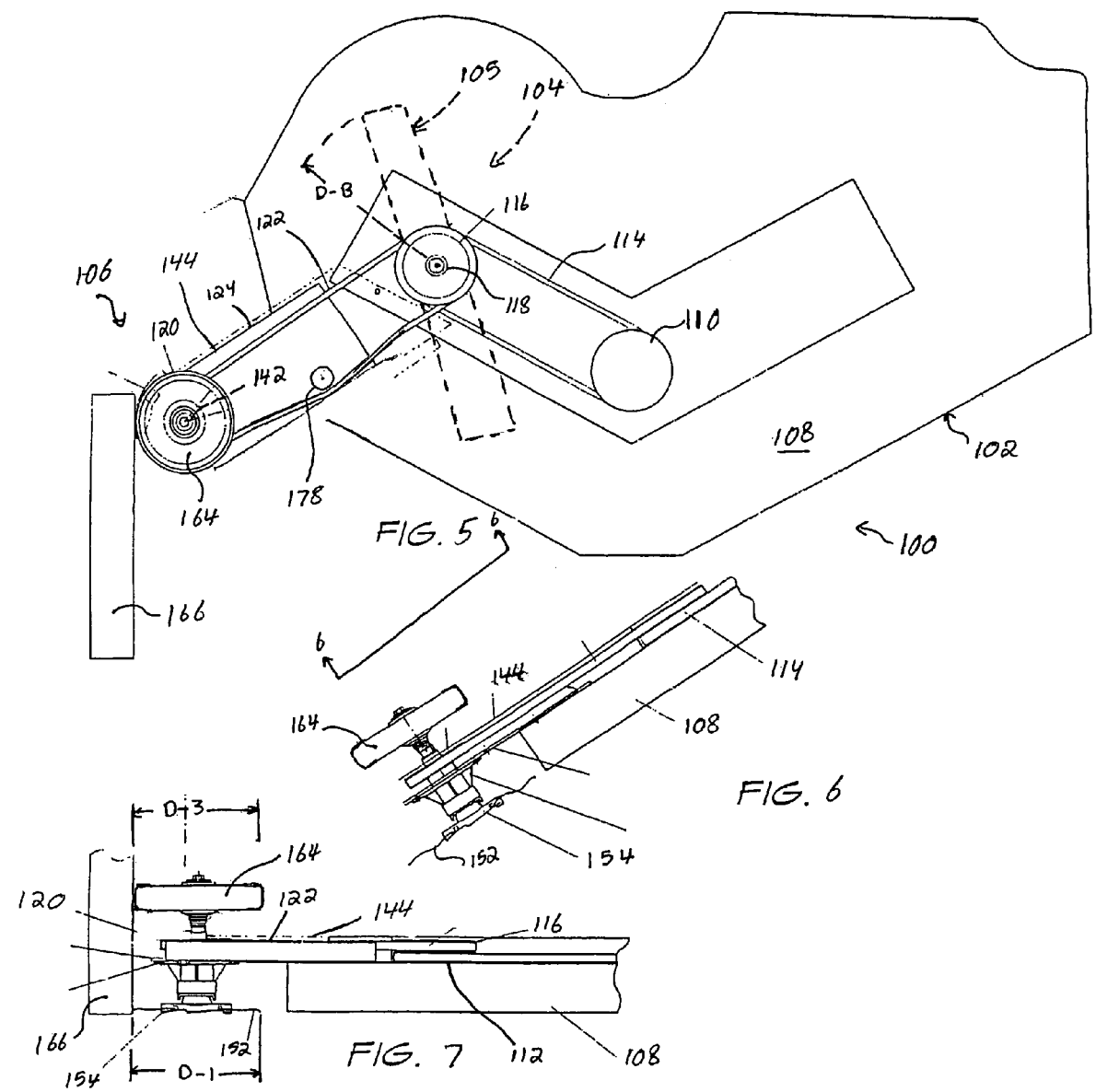

MOWER TRIMMER COMBINATION FOR FACILITATING SIMULTANEOUS MOWING AND EDGE TRIMMING IN A SINGLE PASS

RELATED APPLICATIONS

This application claims benefit of priority of Provisional Application Ser. No. 60/458,966 filed on Apr. 1, 2003.

BACKGROUND OF INVENTION a. Field of Invention

The invention relates generally to equipment for mowing and trimming grass and the like, and, more particularly to a mower trimmer combination for facilitating simultaneous mowing and edge trimming of grass and the like in a single pass.

b. Description of Related Art

The maintenance and caretake of sizable real property generally involves a substantial investment of time, labor and expense in the maintenance of the natural grounds of the property. For owners of cemeteries and the like, such maintenance is of paramount importance, as the continued success of such a business depends largely upon the visual upkeep of the property. In addition to the general maintenance of trees, pathways, benches and fence lines, cemeteries require virtually year-around maintenance of grass in the areas of the headstones. The continued ownership and upkeep of a cemetery thus requires a substantial investment in mowing and trimming equipment, as well as a substantial investment in personnel for performing such services.

Due to the generally uniform spacing between headstones, cemeteries typically utilize standard 44"-72" commercial ride-on mowers for cutting grass between upright headstone sections, as well as for cutting grass in the area of level headstones. Thereafter, with the grass between the headstone sections cut, a number of personnel are often utilized to trim the grass adjacent the edges of the headstone sections, as well as the grass adjacent the edges of trees, pathways, benches, fence lines and the like. It therefore becomes readily apparent that a significant portion of an annual operation budget for a cemetery includes the monetary investment for employing personnel for cutting and thereafter trimming grass and shrubbery as needed, as well as the monetary investment for purchasing and maintaining such cutting and trimming equipment, and the reduction of such an investment would be highly desirable.

In the art, there exist a variety of automatic equipment such as portable line-fed weed trimmers and walk-behind weed trimmers. As disclosed in U.S. Pat. Nos. 5,303,532 and 5,694,752, the respective disclosures of which are incorporated herein by reference, there even exist a handful of systems for retrofitting trimmers and other equipment to existing riding lawn mowers or tractors for enabling removable coupling thereto. For example, the retrofitting systems disclosed in the aforementioned '532 and '752 patents provide assemblies for attachment of free-standing trimming tools that may be pulled besides or adjacent the lawn mower or tractor. While such retrofitted systems may be adequate for limited use for a relatively small landscaping operation, for large landscaping operations such as cemeteries and the like which require virtually year-around maintenance, such systems are highly inadequate due to the susceptibility of the trimmer attachments to damage, as well as the requirement for virtually constant adjustment of the trimmer attachments. Moreover, the retrofitted systems disclosed in the '532 and '752 patents would be unacceptable for cemeteries and the like for which unguided contact of a trimmer wire with a headstone would be unacceptable due to the resultant damage to the headstone, and for which multiple passes would nonetheless be needed to mow and trim a given area due to the un-synchronized cutting areas of the mowing and trimming units.

Yet further, as disclosed in U.S. Pat. Nos. 4,949,534, 5,065,566, 5,159,803, the respective disclosures of which are incorporated herein by reference, there exist a handful of mowers including pre-formed trimming units for facilitating the mowing and trimming operation. For example, the aforementioned '534 and '566 patents disclose trimmer attachments including pivotal booms for carrying one or more trimming heads, with the booms being deflectable around trees and the like for facilitating the trimming operation. Moreover, the '803 patent discloses an integrally formed trimming unit which may be controlled via controls provided on the mower. The combination mowing and trimming units disclosed in the aforementioned '534, '566 and '803 patents nevertheless are inadequate for use for cemeteries and the like for which contact of a boom with a headstone would be unacceptable due to the resultant potential damage to the headstone, and for the adequacy of the trimming operation, as is achievable by the trimming attachment disclosed in the '803 patent. Moreover, the combination mowing and trimming units disclosed in the aforementioned '534, '566 and '803 patents would also be inadequate for use for cemeteries and the like due to the complexity of the inventions disclosed therein, as such units would require an unnecessary degree of maintenance and upkeep for adequate operation, and such units would further require multiple passes for mowing and trimming a given area due to the un-synchronized cutting areas thereof.

It would therefore be of benefit to provide a mower trimmer combination for facilitating mowing and edge trimming of grass and the like in a single pass in cemeteries and other such facilities for which the integrity of fixtures such as headstones, monuments, trees and the like is of paramount importance. It would also be of benefit to provide a mower trimmer combination which is relatively easy to assemble and disassemble, which includes a limited number of required components for ease of operability as well as for increased reliability and robustness of design, and which is economically feasible to manufacture.

SUMMARY OF INVENTION

The invention solves the problems and overcomes the drawbacks and deficiencies of prior art mowing and trimming systems by providing a mower trimmer combination for facilitating the simultaneous mowing and edge trimming of grass and the like in a single pass.

It is therefore an object of the present invention to provide a mower trimmer combination which enables the mowing and edge trimming of grass and the like in a single pass in cemeteries and other such facilities while adequately maintaining the integrity of fixtures such as headstones, monuments, trees and the like.

The invention thus provides a trimming system for a user-operated ground vehicle capable of performing mowing and trimming operations. The system includes drive means operatively coupled to a drive system of the vehicle having the trimming system mounted thereon, and a trimming unit operatively coupled to the drive means for performing edge trimming operations.

For the trimming system discussed above, the drive means may include at least one driven pulley operatively coupled to a drive pulley of the vehicle for driving the trimming unit. The drive pulley may be coupled to a mowing unit and the trimming unit to either selectively or simultaneously drive the mowing and trimming units. A guide wheel may be mounted on the vehicle adjacent the trimming unit for maintaining a trimming wire of the trimming unit at a predetermined distance from a stationary object during performance of edge trimming operations. In a particular embodiment disclosed, the guide wheel may be made of nylon, but any suitable material may be used, as would be apparent to those skilled in the art. The guide wheel may be mounted on a resiliently biased bracket for resiliently deflecting a predetermined distance upon contact with the stationary object, or alternatively, the guide wheel may be mounted on a driven axle of the trimming unit for maintaining a trimming wire of the trimming unit at a predetermined distance from a stationary object during performance of edge trimming operations. The guide wheel may be mounted on the vehicle by a threaded shaft to enable height adjustment of the guide wheel by rotation of the guide wheel relative to the shaft. The trimming unit may include a spindle having one or more trimming wires for enabling performance of edge trimming operations during rotation of the spindle. The spindle may be coupled to the trimming unit by a threaded shaft to enable height adjustment of the spindle by rotation of the spindle relative to the shaft. The trimming unit may be coupled to the vehicle by a threaded shaft to enable height adjustment of the trimming unit by rotation of the trimming unit relative to the shaft.

In a further embodiment, the present invention provides a vehicle for performing mowing and edge trimming operations. The vehicle may include a mowing system for performing mowing operations, and a trimming system for performing edge trimming operations. The trimming system may be operatively coupled to a drive system of the vehicle for either selectively or simultaneously driving the mowing and trimming systems.

For the vehicle described above, the drive system may include at least one drive pulley for either selectively or simultaneously driving the mowing and trimming systems. The drive system may further include at least one driven pulley operatively coupled to the drive pulley for driving the trimming system.

In yet a further embodiment, the present invention provides a mowing and trimming system including a drive unit including at least one drive and driven pulley, the drive pulley operatively coupled to the driven pulley to either selectively or simultaneously drive a mowing unit for performing mowing operations and a trimming unit for performing edge trimming operations.

For the mowing and trimming system described above, a guide wheel may be mounted on a vehicle having the mowing and trimming system mounted thereon. The guide wheel may be mounted adjacent the trimming unit for maintaining a trimming wire of the trimming unit at a predetermined distance from a stationary object during performance of edge trimming operations. The guide wheel may be mounted on a resiliently biased bracket for resiliently deflecting a predetermined distance upon contact with the stationary object. Alternatively, the guide wheel may be mounted on a driven axle of the trimming unit for maintaining a trimming wire of the trimming unit at a predetermined distance from a stationary object during performance of edge trimming operations. Yet further, the guide wheel may be mounted by a threaded shaft to enable height adjustment of the guide wheel by rotation of the guide wheel relative to the shaft. The trimming unit may include a spindle having a trimming wire for enabling performance of edge trimming operations during rotation of the spindle. The spindle may be coupled to the trimming unit by a threaded shaft to enable height adjustment of the spindle by rotation of the spindle relative to the shaft. The trimming unit likewise may be coupled to the vehicle by a threaded shaft to enable height adjustment of the trimming unit by rotation of the trimming unit relative to the shaft.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 1 is a top view of a first embodiment of the trimming unit according to the present invention, with a top cover of the mower trimmer combination removed, illustrating operation of the trimming unit adjacent an exemplary upright fixture;

FIG. 2 is a partial view of the trimming unit of FIG. 1, taken generally in the viewing direction of line 2-2, illustrating various features of the trimming unit;

FIG. 3 is a partial front view of the trimming unit of FIG. 1, illustrating various features of the trimming unit;

FIG. 5 is a top view of a second embodiment of the trimming unit according to the present invention, with a top cover of the mower trimmer combination removed, illustrating operation of the trimming unit adjacent an exemplary upright fixture;

FIG. 6 is a partial view of the trimming unit of FIG. 5, taken generally in the viewing direction of line 6-6, illustrating various features of the trimming unit;

FIG. 7 is a partial front view of the trimming unit of FIG. 5, illustrating various features of the trimming unit.

DETAILED DESCRIPTION OF THE PREFERRED EMBODIMENTS

Figure 4:
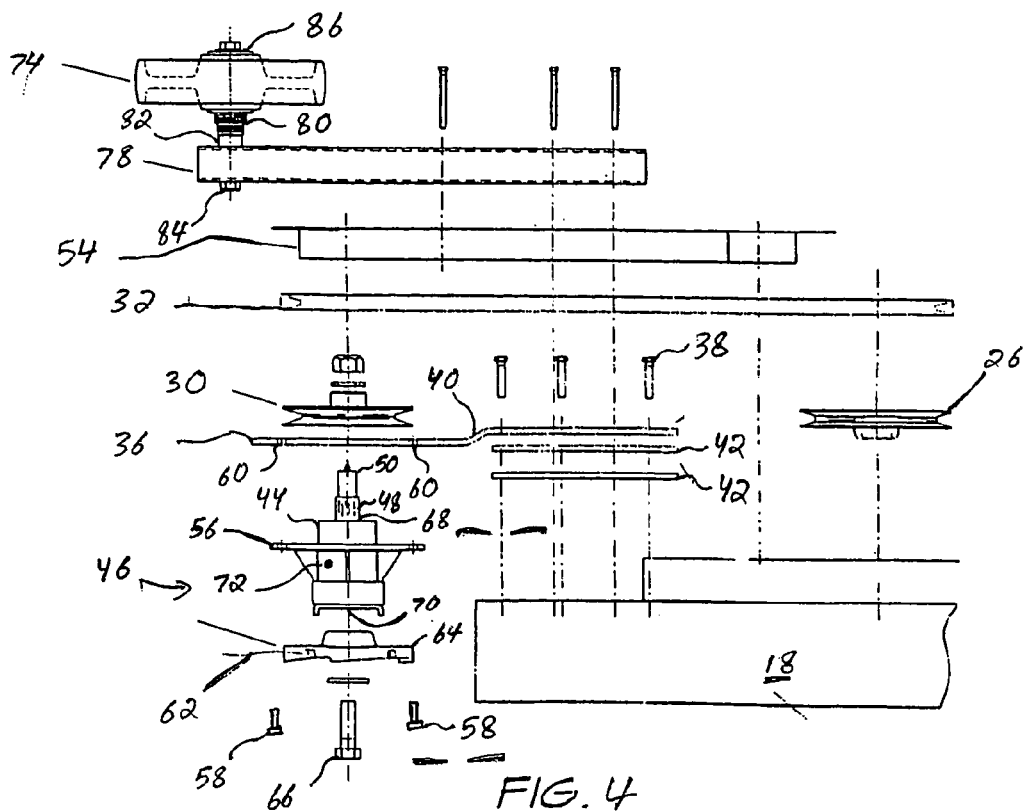
FIG. 4 is an exploded assembly view of the trimming unit of FIG. 1, illustrating various features of the trimming unit in their disassembled configuration.

Referring now to the drawings wherein like reference numerals designate corresponding parts throughout the several views, FIGS. 1-4 illustrate a first embodiment of a mower trimmer combination according to the present invention, generally designated 10.

As shown in FIG. 1, mower trimmer combination 10 may generally include a ground vehicle 12, such as a conventional mower or tractor, including mowing and trimming systems 14 and 16, respectively. Mowing system 14 may generally include a plurality of blades 15 disposed below deck 18 and operable by a pulley system including drive and driven pulleys 20 and 22, respectively, each interconnected by drive V-belt 24. Pulleys 22 and 24 may each be in the form of conventional pulleys for driving V-belt 24, or may comprise a drive system such as pulley/chain system and the like.

Referring to FIGS. 1-4, the first embodiment of trimming system 16 may generally include a drive pulley 26 operatively mounted on shaft 28 of driven pulley 22 for driving driven pulley 30 by means of V-belt 32. As discussed above for pulleys 22 and 24, pulleys 26 and 30 may each be in the form of conventional pulleys for driving V-belt 32, or may comprise a drive system such as pulley/chain system and the like. The assembly including driven pulley 30 of trimming system 16 may be mounted into slot 34 of deck 18 by means of lower bracket 36, which may be removably connected to deck 18 by means of fasteners 38. In the embodiment illustrated in FIG. 4, bracket 36 may include a bent section 40 for providing additional rigidity as well as for maintaining trimming unit 46 and V-belt 32 in a predetermined level orientation. As illustrated in FIG. 4, brackets 42 may be utilized for spacing lower bracket 36 at a predetermined distance from deck 18, but may be eliminated for vehicles 12 of a different configuration. Lower bracket 36 may further include a hole (not shown) for permitting axle 44 of trimming unit 46 to extend therethrough. Axle 44 may include pulley mount 48 having a threaded shaft 50 provided thereon.

As shown in FIG. 2, when assembled, threaded shaft 50 may be inserted through hole 52 in upper bracket 54, and with V-belt 32 engaged with driven pulley 30, axle 44 of trimming unit 46 may be inserted through the hole (not shown) in lower bracket 36. Retainer 56 of trimming unit 46 may be fixedly mounted to lower bracket 36 by means of suitable fasteners 58 inserted through holes 60 and thereby affixed to lower bracket 36.

As shown in FIGS. 2-4, trimming unit 46 may include a plurality of trimming wires 62 mounted onto spindle 64. In the embodiment shown, wires 62 may have a rotary diameter D-1 during rotation of trimming unit 46 such that the diameter of the area of grass and the like trimmed by trimming unit 46 is synchronized with the edge of the rotary diameter D-B of blades 15 so as to fully mow and trim grass and the like in a single pass by vehicle 12, and such that no uncut grass gap is left between blades 15 and trimming wires 62, without wires 62 and blades 15 coming into contact with each other. Spindle 64 may be fixedly mounted onto axle 44 by fastener 66. Axle 44 may further include bearings (not shown) at ends 68, 70 for facilitating smooth rotation thereof. A grease fitting 72 may be provided on axle 44 for periodically injecting lubricating grease into axle 44 for facilitating the smooth rotation thereof.

With trimming unit 46 installed onto vehicle 12, optionally, a guide wheel 74, preferably made of nylon, may be mounted adjacent trimming unit 46 as shown in FIG. 1, for guiding the movement of trimming unit 46 relative to a stationary object 76. Referring to FIG. 3, guide wheel 74 may include a diameter D-2, such that when mounted onto vehicle 12 by means of bracket 78, diameter D-2 is sufficient to ensure a predetermined maximum degree of contact between wires 62 of trimming unit 46 and object 76. As discussed above for axle 44, guide wheel 74 may likewise include a bearing unit 80 rotatably affixed to threaded shaft 82, which may be mounted to bracket 78 by means of fastener 84. The opposite end of guide wheel 74 may likewise include a bearing unit 86 for facilitating continued smooth rotation thereof relative to stationary object 76, as needed.

In an alternative embodiment, bracket 78 may be resiliently mounted onto vehicle 12 by means of a conventional spring, such as a coil spring, or preferably a torsion spring 90 adjacent edge 92, so as to enable the resilient deflection thereof by a predetermined amount upon contact with a stationary object so as to prevent inadvertent damage to the stationary object by trimming unit 46. Alternatively, bracket 78 may itself be made of a material which resiliently deflects a predetermined amount upon contact with a stationary object.

In operation, once assembled onto vehicle 12, an operator may drive vehicle 12 including mowing and trimming systems 14, 16, respectively, mounted thereon to cut grass and the like in the conventional manner as by mowing system 14. At the same time, the operator may visually view the operation of trimming unit 46 as governed by the operational diameter D-1 of trimming wires 62. In this manner, the operator may visually guide the operation of vehicle 12 to trim grass and the like adjacent edges of stationary object 76 by means of trimming unit 46, while simultaneously cutting grass and the like in a conventional manner as by mowing system 14.

For the alternative embodiment including guide wheel 74 described above, the operator may likewise visually guide the operation of vehicle 12 to trim grass and like adjacent edges of stationary object 76 by means of trimming unit 46 and the guidance provided by guide wheel 74, while simultaneously cutting grass and the like in a conventional manner as by mowing system 14.

The second embodiment of mower trimmer combination 100 will now be described in detail with reference to FIGS. 5-8.

For the second embodiment, as described above for the first embodiment, mower trimmer combination 100 may generally include a ground vehicle 102, such as a conventional mower or tractor, including mowing and trimming systems 104 and 106, respectively. Mowing system 104 may generally include a plurality of blades 105 disposed below deck 108 and operable by a pulley system including drive and driven pulleys 110 and 112, respectively, each interconnected by drive V-belt 114. Pulleys 112 and 114 may each be in the form of conventional pulleys for driving V-belt 114, or may comprise a drive system such as pulley/chain system and the like.

Figure 8:
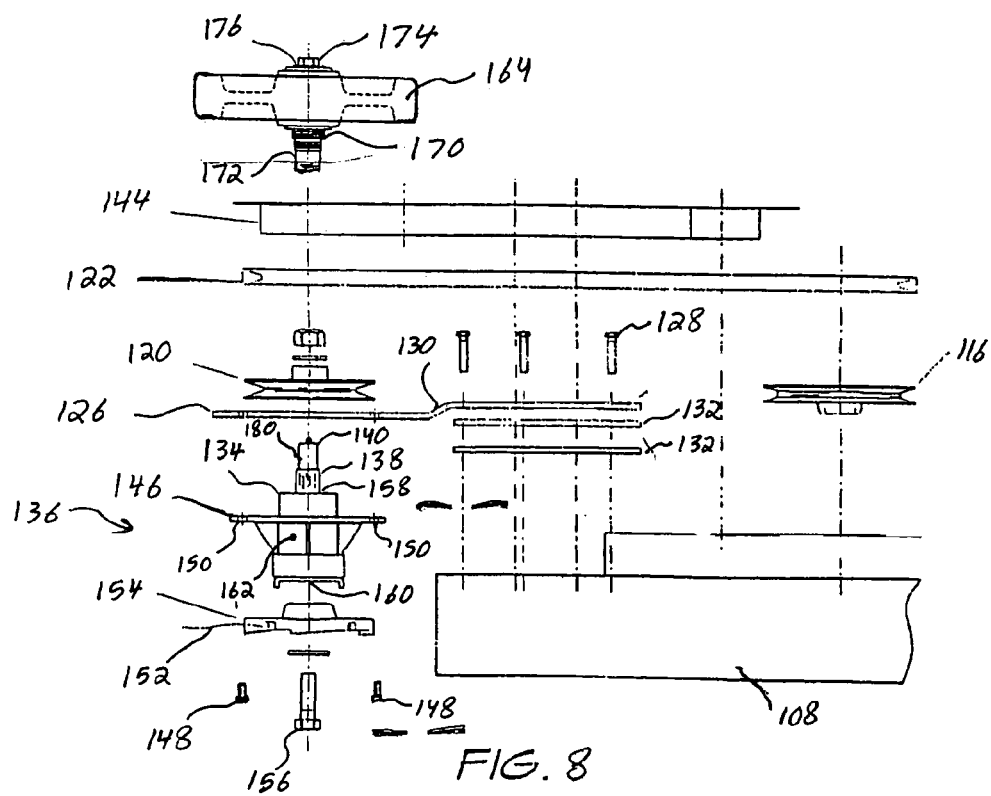
FIG. 8 is an exploded assembly view of the trimming unit of FIG. 5, illustrating various features of the trimming unit in their disassembled configuration.

Referring to FIGS. 5-8, the second embodiment of trimming system 106 may generally include a drive pulley 116 operatively mounted on shaft 118 of driven pulley 112 for driving driven pulley 120 by means of V-belt 122. As discussed above for pulleys 112 and 114, pulleys 116 and 120 may each be in the form of conventional pulleys for driving V-belt 122, or may comprise a drive system such as pulley/chain system and the like. The assembly including driven pulley 120 of trimming system 106 may be mounted into slot 124 of deck 108 by means of lower bracket 126, which may be removably connected to deck 108 by means of fasteners 128. In the embodiment illustrated in FIG. 8, lower bracket 126 may include a bent section 130 for providing additional rigidity as well as for maintaining trimming unit 136 and V-belt 122 in a predetermined level orientation. An idler pulley 178 may be provided as shown in FIG. 5 for maintaining V-belt 122 at a predetermined tension, thereby reduce any slack in V-belt 122 which may create heat during rotation of belt 122. As illustrated in FIG. 8, brackets 132 may be utilized for spacing lower bracket 126 at a predetermined distance from deck 108, but may be eliminated for vehicles 102 of a different configuration. Lower bracket 126 may further include a hole (not shown) for permitting axle 134 of trimming unit 136 to extend therethrough. Axle 134 may include pulley mount 138 having a threaded shaft 140 provided thereon.

As shown in FIG. 6, when assembled, threaded shaft 140 may be inserted through hole 142 in upper bracket 144, and with V-belt 122 engaged with driven pulley 120, axle 134 of trimming unit 136 may be inserted through the hole (not shown) in lower bracket 126. Retainer 146 of trimming unit 136 may be fixedly mounted to lower bracket 126 by means of suitable fasteners 148 inserted through holes 150 and thereby affixed to lower bracket 126.

As shown in FIGS. 6-8, as discussed above for the first embodiment, for the second embodiment, trimming unit 136 may include a plurality of trimming wires 152 mounted onto spindle 154. In the embodiment shown, wires 152 may have a rotary diameter D-1 during rotation of trimming unit 136 such that the diameter of the area of grass and the like trimmed by trimming unit 136 is synchronized with the edge of the rotary diameter D-B of blades 105 so as to fully mow and trim grass and the like in a single pass by vehicle 102, and such that no uncut grass gap is left between blades 105 and trimming wires 152, without wires 152 and blades 105 coming into contact with each other. Spindle 154 may be fixedly mounted onto axle 134 by fastener 156. Axle 134 may further include bearings (not shown) at ends 158, 160 for facilitating smooth rotation thereof. A grease fitting 162 may be provided on axle 134 for periodically injecting lubricating grease into axle 134 for facilitating the smooth rotation thereof.

With trimming unit 136 installed onto vehicle 102, optionally, a guide wheel 164, preferably made of nylon, may be mounted on axle 180 of trimming unit 136 as shown in FIG. 5, for guiding the movement of trimming unit 136 relative to a stationary object 166. Guide wheel 164 may include a diameter D-3 which is greater than rotary diameter D-1 of trimming unit 136, such that when mounted onto axle 180, diameter D-3 is sufficient to ensure a predetermined maximum degree of contact between wires 152 of trimming unit 136 and object 166. As discussed above for axle 134, guide wheel 164 may likewise include a bearing unit 170 rotatably affixed to threaded shaft 172, and may be mounted to shaft 172 by means of fastener 174. The opposite end of guide wheel 164 may likewise include a bearing unit 176 for facilitating continued smooth rotation thereof relative to stationary object 166, as needed.

As discussed above, the afore-described mower trimmer combinations 10, 100, thus enable the performance of mowing and edge trimming operations in a reduced number of passes along stationary objects. For example, referring to FIG. 1, with vehicle 12 traveling downwards in the direction of FIG. 1 adjacent object 76, trimming wires 62 trim grass and the like adjacent the right half of edge 94, then along edge 95, and finally adjacent the right half of edge 96. On the return pass with vehicle 12 traveling upwards in the direction of FIG. 1 adjacent object 76, trimming wires 62 trim grass and the like adjacent the left half of edge 96, then along edge 98, and finally adjacent the left half of edge 94. For objects, such as headstones which are placed in close proximity to each other, trimming wires 62 allow for the trimming as well as the cutting of grass and the like between adjacently disposed objects, thus eliminating the need for an operator to make a separate pass to cut grass and the like between such objects. It should be apparent that the same number of passes would be needed for a vehicle 102 equipped with mower trimmer combination 100. Thus vehicles equipped with mower trimmer combinations 10, 100 enable an operator to perform the same mowing and edge trimming tasks by reducing the number of overall passes needed.

As also discussed above, various modifications may be made to mower trimmer combinations 10 or 100 without departing from the scope of the present invention. For example, for the first embodiment of mower trimmer combinations 10, since the drive mechanism for trimming system 16 illustrated in FIG. 1 is integrally coupled with the drive mechanism for mowing system 14 for enabling simultaneous operation and control of systems 14, 16, in order to provide for selective control of systems 14, 16, a conventional decoupling or lift mechanism may be provided adjacent pulley 30, pulley mount 48, or likewise coupled to trimming unit 46 so as to decouple the respective drive mechanisms for systems 14, 16 to thereby enable selective control of systems 14, 16. Additionally, the diameters of pulleys 20, 22 and 30 (and 110, 112 and 120) may be increased or decreased as needed to adjust the rotational speed of trimming unit 46 (and unit 136), and the location of trimming units 46 (and 136) relative to blades 15 (and 105) may be adjusted or made adjustable as needed to cut and trim grass and the like in a single pass. By varying the diameters of the pulleys (or the gearing of a gear/chain system), as discussed above, the relative speeds of blades 15 (and 105) and trimming wires 62 (and 152) of trimming units 46 (and 136) may be adjusted to minimize any potential damage to delicate objects, such as marble headstones, trashcans, wooden fences and the like.

From the aforementioned discussion, those skilled in the art would appreciate in view of this disclosure that that the features and options discussed above for the first embodiment of mower trimmer combination 10 are likewise applicable to the second embodiment of mower trimmer combination 100, and vice-versa.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A trimming system for a user-operated ground vehicle capable of performing mowing and trimming operations, said system comprising:

drive means operatively coupled to a drive system of the vehicle having said trimming system mounted thereon;

a trimming unit operatively coupled to said drive means for performing edge trimming operations, a guide wheel mounted to a vehicle frame adjacent said trimming unit for maintaining said trimming unit at a predetermined distance from a stationary object during performance of said edge trimming operations, said guide wheel being mounted to a first end of a resiliently biased bracket dimensioned to materially deflect, said bracket being rigidly mounted at a second, distal end to the vehicle frame and resiliently biased by a spring mounted between the vehicle frame and said bracket for allowing material and spring biased deflection of said bracket by a predetermined distance under the bias of said spring relative to said trimming unit and the vehicle frame upon contact of said guide wheel with the stationary object; and wherein said trimming unit including a spindle having at least one trimming wire for enabling performance of said edge trimming operations during rotation of said spindle, said spindle being coupled to said trimming unit by a threaded shaft to enable height adjustment of said spindle by rotation of said spindle relative to said shaft.

2. A trimming system according to claim 1, wherein said drive means comprising at least one driven pulley operatively coupled to a drive pulley of the vehicle for driving said trimming unit.

3. A trimming system according to claim 2, wherein said drive pulley being coupled to a mowing unit and said trimming unit to at least one of selectively and simultaneously drive a mowing unit and said trimming unit.

4. A trimming system according to claim 1, wherein said guide wheel being made of nylon.

5. A trimming system according to claim 1, wherein said bracket permits the predetermined deflection of said guide wheel to thus enable a user to operate the vehicle at a full speed in the vicinity of stationary objects.

6. A trimming system for a user-operated ground vehicle capable of performing mowing and trimming operations, said system comprising:
   drive means operatively coupled to a drive system of the vehicle having said trimming system mounted thereon;
   a trimming unit operatively coupled to said drive means for performing edge trimming operations; and
   a guide wheel mounted to a vehicle frame adjacent said trimming unit for maintaining said trimming unit at a predetermined distance from a stationary object during performance of said edge trimming operations, said guide wheel being mounted to a first end of a resiliently biased bracket dimensioned to materially deflect, said bracket being rigidly mounted at a second, distal end to the vehicle frame and resiliently biased by a spring mounted between the vehicle frame and said bracket for allowing material and spring biased deflection of said bracket by a predetermined distance under the bias of said spring relative to said trimming unit and the vehicle frame upon contact of said guide wheel with the stationary object; and
   wherein said trimming unit being coupled to the vehicle by a threaded shaft to enable height adjustment of said trimming unit by rotation of said trimming unit relative to said shaft.

7. A trimming system for a user-operated ground vehicle capable of performing mowing and trimming operations, said system comprising:
   drive means operatively coupled to a drive system of the vehicle having said trimming system mounted thereon;
   a trimming unit operatively coupled to said drive means for performing edge trimming operations; and
   a guide wheel mounted to a vehicle frame adjacent said trimming unit for maintaining said trimming unit at a predetermined distance from a stationary object during performance of said edge trimming operations, said guide wheel being mounted to a first end of a resiliently biased bracket, said bracket being rigidly mounted at a second, distal end to the vehicle frame and resiliently biased for allowing deflection of said bracket by a predetermined distance relative to said trimming unit and the vehicle frame upon contact of said guide wheel with the stationary object.

8. A trimming system according to claim 7, wherein said trimming unit including a spindle having at least one trimming wire for enabling performance of said edge trimming operations during rotation of said spindle, said spindle being coupled to said trimming unit by a threaded shaft to enable height adjustment of said spindle by rotation of said spindle relative to said shaft.

9. A trimming system according to claim 7, wherein said drive means comprising at least one driven pulley operatively coupled to a drive pulley of the vehicle for driving said trimming unit.

10. A trimming system according to claim 9, wherein said drive pulley being coupled to a mowing unit and said trimming unit to at least one of selectively and simultaneously drive said mowing and trimming units.

11. A trimming system according to claim 7, wherein said guide wheel being made of nylon.

12. A trimming system according to claim 7, wherein said bracket permits the predetermined deflection of said guide wheel to thus enable a user to operate the vehicle at full speed away from and in the vicinity of stationary objects without requiring reduction of the speed in the vicinity of stationary objects.

13. A trimming system for a user-operated ground vehicle capable of performing mowing and trimming operations in a cemetery including cemetery headstones of various configurations, said system comprising:
   drive means operatively coupled to a drive system of the vehicle having said trimming system mounted thereon;
   a trimming unit operatively coupled to said drive means for performing edge trimming operations; and
   a guide wheel mounted to a vehicle frame adjacent said trimming unit for maintaining said trimming unit at a predetermined distance from the cemetery headstone during performance of said edge trimming operations such that at least one trimming wire of said trimming unit contacts the cemetery headstone, said guide wheel mounted to a first end of a resiliently biased bracket, said bracket being rigidly mounted at a second, distal end to the vehicle frame and resiliently biased for allowing deflection of said bracket by a predetermined distance relative to said trimming unit and the vehicle frame upon contact of said guide wheel with the cemetery headstone.

14. A trimming system according to claim 13, wherein said trimming unit including a spindle having at least one trimming wire for enabling performance of said edge trimming operations during rotation of said spindle, said spindle being coupled to said trimming unit by a threaded shaft to enable height adjustment of said spindle by rotation of said spindle relative to said shaft.

15. A trimming system according to claim 13, wherein said drive means comprising at least one driven pulley operatively coupled to a drive pulley of the vehicle for driving said trimming unit.

16. A trimming system according to claim 15, wherein said drive pulley being coupled to a mowing unit and said trimming unit to at least one of selectively and simultaneously drive said mowing and trimming units.

17. A trimming system according to claim 13, wherein said guide wheel being made of nylon.

18. A trimming system according to claim 13, wherein said bracket permits the predetermined deflection of said guide wheel to thus enable a user to operate the vehicle at full speed away from and in the vicinity of the cemetery headstones without requiring reduction of the speed in the vicinity of the cemetery headstones.

19. A trimming system according to claim 13, wherein said bracket is positioned such that said trimming wire of said trimming unit contacts the cemetery headstone to cut grass directly adjacent the cemetery headstone.

* * * * *